(12) United States Patent
Wirth

(10) Patent No.: US 7,225,906 B2
(45) Date of Patent: Jun. 5, 2007

(54) VIBRATION DAMPER HAVING A JOINT EYE

(75) Inventor: Peter Wirth, Schonungen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/963,017

(22) Filed: Oct. 12, 2004

(65) Prior Publication Data

US 2005/0082128 A1    Apr. 21, 2005

(30) Foreign Application Priority Data

Oct. 17, 2003    (DE) ................ 103 48 315

(51) Int. Cl.
*F16F 9/19* (2006.01)
(52) U.S. Cl. .................. 188/315; 188/321.11
(58) Field of Classification Search ................ 188/313, 188/316, 317, 318, 321.11, 322.14, 315; 403/220, 226, 265, 269

See application file for complete search history.

(56) References Cited

U.S. PATENT DOCUMENTS 3,882,977 A * 5/1975 Watanabe .............. 188/322.14
5,595,270 A   1/1997 Braun et al.
5,730,262 A * 3/1998 Rucks et al. ........... 188/321.11
5,839,552 A * 11/1998 Vandewal et al. ...... 188/321.11

FOREIGN PATENT DOCUMENTS

| DE | 1 859 436 | 10/1962 |
| DE | 1 882 287 | 11/1963 |
| DE | 38 22 421 | 1/1990 |
| DE | 42 32 136 | 3/1994 |
| DE | 196 29 959 | 1/1998 |
| DE | 197 50 414 | 9/1998 |
| DE | 101 35 252 | 3/2002 |
| GB | 1587936 | 4/1981 |

* cited by examiner

*Primary Examiner*—Christopher P Schwartz
(74) *Attorney, Agent, or Firm*—Cohen Pontani Lieberman & Pavane LLP

(57) ABSTRACT

Vibration damper cylinder, in which a piston rod is guided with freedom of axial movement, where the cylinder has a compensating space, the volume of which is partially determined by an outer sleeve of a joint eye attached to the cylinder. The joint eye has an inner sleeve inside the outer sleeve, and where these two sleeves form a ring-shaped space, which is in flow connection with the compensating space.

11 Claims, 4 Drawing Sheets

VIBRATION DAMPER HAVING A JOINT EYE

BACKGROUND OF THE INVENTION

1. Field of the Invention

The invention pertains to a vibration damper having a compensating space in a cylinder, and a joint eye with an outer sleeve attached to the cylinder and bounding the compensating space.

2. Description of the Related Art

Especially in the case of single-tube vibration dampers, there is frequently the problem that the axial space available is too short for a compensating space of conventional design. For some time there have been designs in which the compensating space, which, under certain conditions, can have a considerable axial dimension, is located in a housing axially parallel to the cylinder. This solution is comparatively complicated, especially in the area of the connection between the cylinder, in which the piston rod is supported with freedom of movement, and the housing. Reference can be made here to DE 101 35 252 A1.

German Registered Design DE 92 08 619 U1 describes a vibration damper with a joint eye which forms the boundary of one end of the compensating space and has an inset area, which can be used as additional volume for the compensating space. The gain in volume for the compensating space, however, is comparatively small.

SUMMARY OF THE INVENTION

The task of the present invention is to realize a vibration damper, especially a single-tube vibration damper, which makes available to the compensating space a volume which is larger than that known in the state of the art.

This task is accomplished according to the invention in that the joint eye has an inner sleeve inside the outer sleeve, these two sleeves thus forming a ring-shaped space, which is in flow connection with the compensating space.

At present, comparatively thick-walled sleeve parts are still being used for the joint eye. In addition, generously dimensioned elastomeric bodies are also being used in some cases, which means that there is still a significant amount of volume available for the ring-shaped space.

The two sleeves should be of the simplest possible design, and it should be possible to connect them with the smallest possible number of welds. For this reason, both the inner sleeve and the outer sleeve have bottom parts, which form boundaries of the ring-shaped space.

So that the joint eye can be as sturdy as possible, a guide collar is provided on the inner sleeve for the outer sleeve and/or a guide collar is provided on the outer sleeve for the inner sleeve.

In a further advantageous embodiment, the guide collar of the one sleeve rests on the other sleeve in the direction toward the ring-shaped space. As a result, it is possible to shift the two sleeves axially toward each other, so that joint eyes with different overall widths can be obtained with the use of sleeves of the same length.

The inner sleeve and the outer sleeve are preferably made of sheet metal. When components are made of sheet metal, the cost of the tooling plays a major role in the profitability analysis. Because the inner sleeve and outer sleeve have identical contours, a considerable cost advantage is obtained.

In a further embodiment of the design, a weld which connects the inner sleeve to the outer sleeve is provided at the end of one of the two sleeves. This advantageous measure minimizes the heat-induced distortion of the sleeves.

If necessary, the inner sleeve can occupy an off-center position with respect to the outer sleeve, especially in conjunction with the use of an elastomeric body inside the joint eye.

An especially simple design is characterized in that the joint eye is formed by a tube blank, which is formed into a circular ring. A ring can be formed with little effort from a standard tube blank, the butt joint of which is then welded.

DETAILED DESCRIPTION OF THE PRESENTLY PREFERRED EMBODIMENTS

Figure 1:
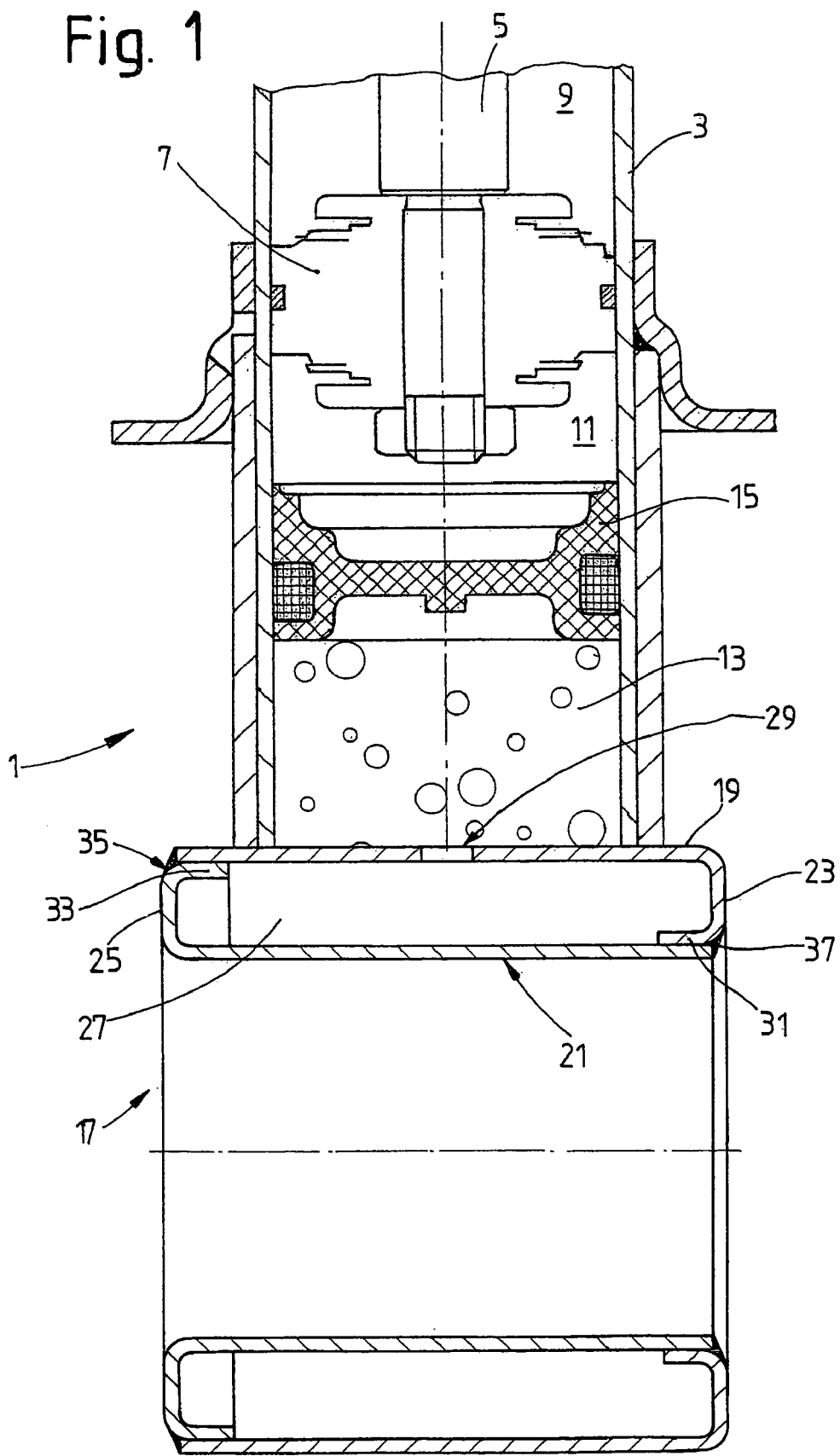
FIG. 1 shows a cross section through a vibration damper in the area of the inventive joint eye.

FIG. 1 shows a cross section through the lower part of a vibration damper 1. Inside a cylinder 3, a piston rod 5 with a piston 7 is supported with freedom of axial movement. The piston 7 divides the cylinder 3 into a damping medium-filled working space 9 on the piston rod side and a working space 11 on the side away from the piston rod, the two working spaces being connected to each other by piston valves as a function of the operating position of the piston. The inward-traveling and outward-traveling piston rod volume and the influence of the thermal expansion of the damping medium are compensated by a compensating space 13 inside the cylinder 3, which is separated by an axially movable separating piston 15 from the working space 11 on the side away from the piston rod. The compensating space is filled with a pressurized gas, which pretensions the separating piston against the column of damping medium.

At one end, the cylinder 3 and thus also the compensating space 13 are closed off by a joint eye 17. The joint eye comprises an outer sleeve 19 and an inner sleeve 21, each of the two sleeves having a bottom part 23, 25. A ring-shaped space 27 is thus obtained, which is in flow connection with the compensating space 13 by way of a connecting opening 29 and which therefore significantly increases the usable volume of the compensating space. The two sleeve parts 19, 21 are made of sheet metal, and each one has a guide collar 31, 33 for the guidance of the other sleeve, where the guide collar of the one sleeve rests against the other sleeve in the ring-shaped space. The two sleeves have identical contours, so that a sleeve assumes the function of an inner sleeve or of an outer sleeve only after the two have been joined together.

The assembled sleeves are sealed off pressure-tight by welds 35, 37 at the ends. The two sleeves 19, 21 can be displaced axially to a limited extent, which makes it possible to obtain joint eyes with different usable lengths.

Figure 2:
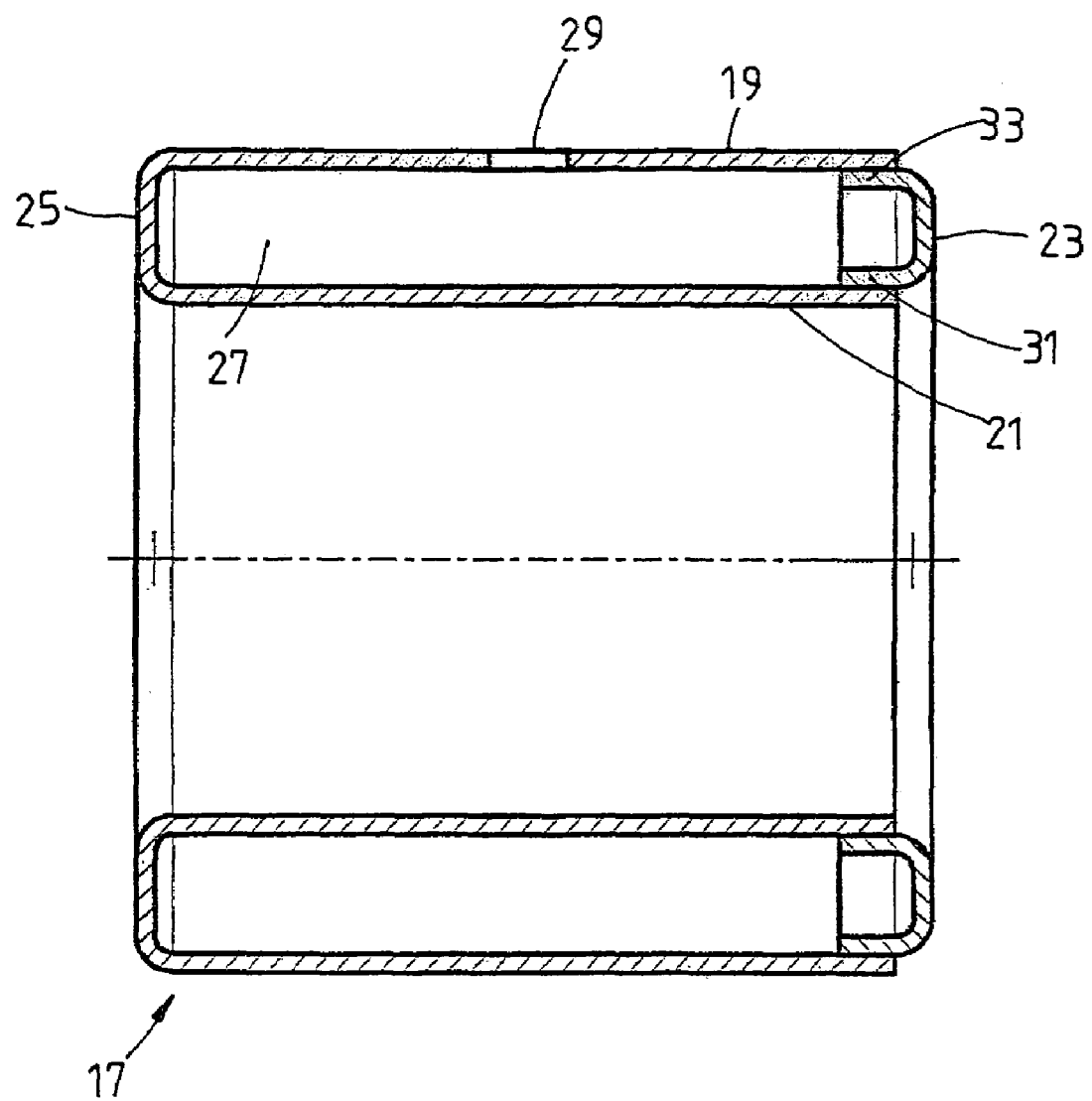
FIG. 2 shows an alternative variant of the joint eye.

FIG. 2 shows a variant according to the principle of FIG. 1, where the inner sleeve 21, the bottom part 25, and the outer sleeve 19 are bent out of a single piece of material. The second bottom part 23 has the two guide collars 31, 33. The second bent part thus has the shape of a U, which is pushed into the first bent part and then welded to it.

Figure 3:
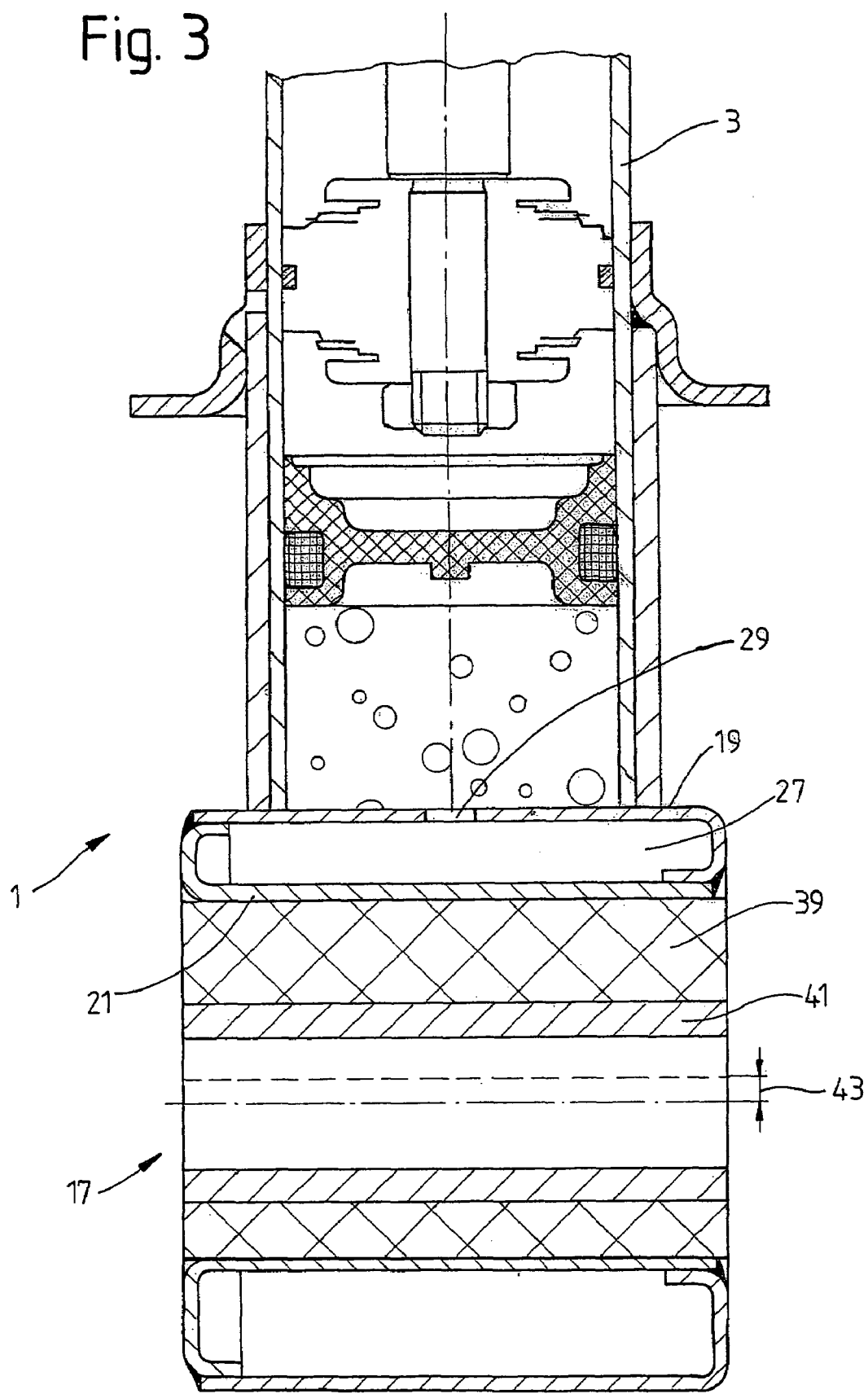
FIG. 3 shows a joint eye with an off-center inner sleeve.

FIG. 3 makes it clear that a sufficiently large elastomeric body 39, possibly in conjunction with a support sleeve 41, can also be used in the case of a joint eye 17 with the same basic design as that of FIG. 1. If desired, it is possible for the inner sleeve 21 to be radially offset 43 with respect to the outer sleeve 19, where the two sleeves 19, 21 can nevertheless still be produced as identical parts.

Figure 4:
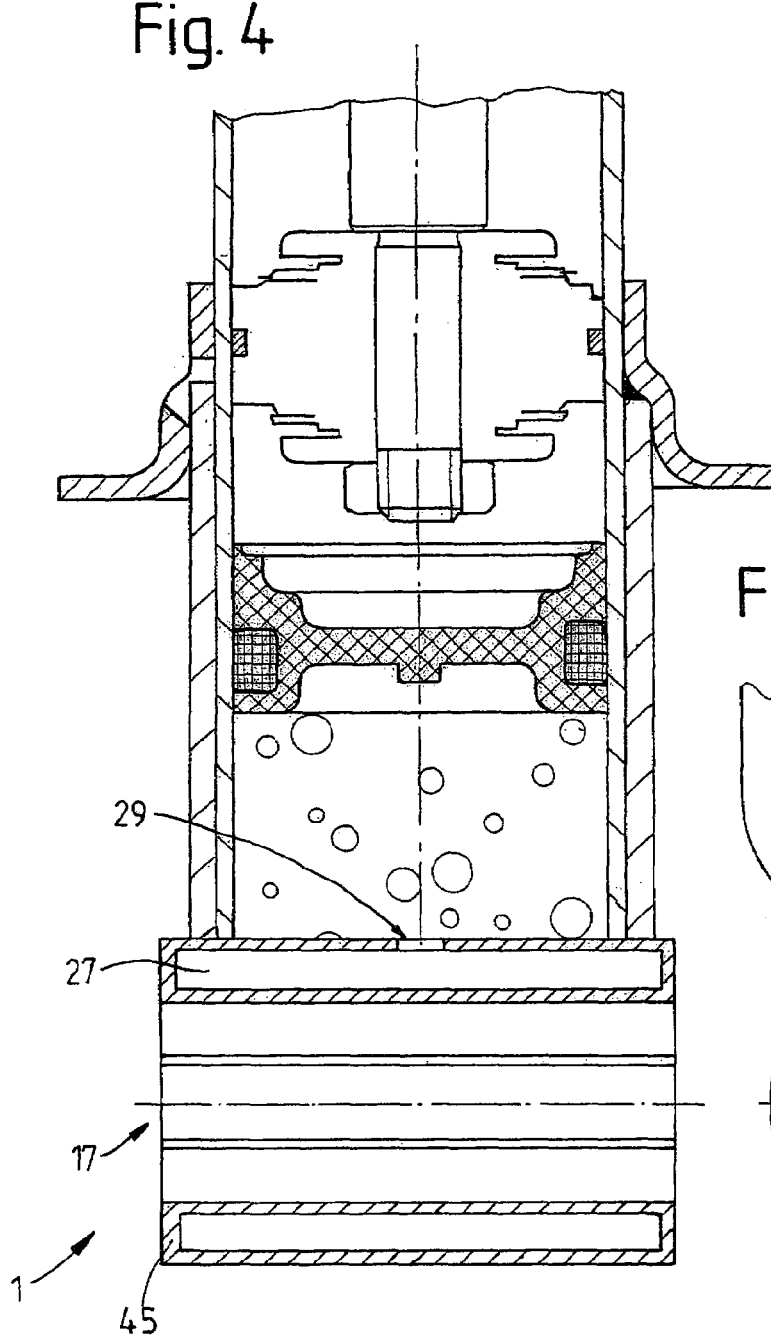
FIGS. 4 and 5 show a joint eye made from a tube blank.
Figure 5:
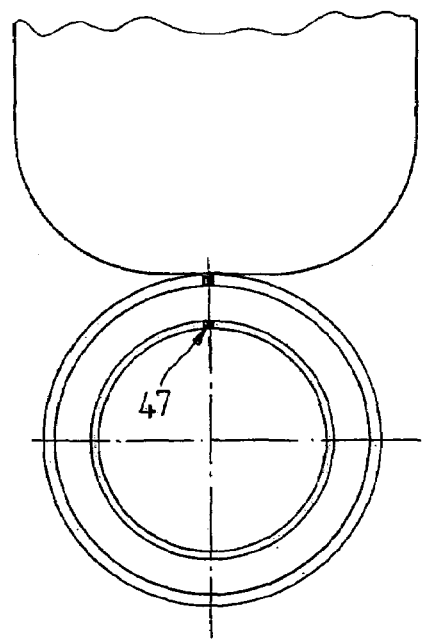

FIGS. 4 and 5 show a joint eye 17, which consists of a cut-to-length tube blank 45, which has been shaped into a circular ring and has its opposite ends butt-welded to form joint 47.

I claim:

1. A vibration damper comprising:
    a cylinder;
    a piston rod with a piston guided with freedom of axial movement in the cylinder, the piston dividing the cylinder into a first working space on a piston rod side and a second working space on a side away from the piston rod, which are at least partially filled with a damping medium;
    a further axially movable piston in the cylinder separating the second working space on the side away from the piston rod from a compensating space, which is filled with a compensating medium; and
    a joint eye bounding the compensating space, the joint eye having an outer sleeve fixed to the cylinder and an inner sleeve inside the outer sleeve, wherein the inner and outer sleeves of the joint eye are fixed relative to one another, the sleeves bounding a ring-shaped self-contained space which is in flow connection only with the compensating space in the cylinder.

2. The vibration damper of claim 1, wherein said sleeves have respective bottom parts which bound the ring-shaped space axially.

3. The vibration damper of claim 2, further comprising a weld joining the bottom parts of each sleeve to the other sleeve.

4. The vibration damper of claim 1, wherein the inner sleeve has a collar which supports the outer sleeve.

5. The vibration damper of claim 4, wherein the outer sleeve has a collar which supports the inner sleeve.

6. The vibration damper of claim 1, wherein at least one of the inner and outer sleeves is formed with a collar which supports the other of the inner and outer sleeves.

7. The vibration damper of claim 1, wherein each of the inner and outer sleeves is formed with a collar and each said collar rests against the other of the sleeves in the ring-shaped space.

8. The vibration damper of claim 1, wherein the inner sleeve and the outer sleeve have substantially identical contours.

9. The vibration damper of claim 1, wherein the inner sleeve is axially offset from the outer sleeve.

10. The vibration damper of claim 1, wherein the joint eye comprises a tube blank having opposite ends joined to one another so that the tube blank is formed in a circular ring comprising said outer sleeve and said inner sleeve.

11. The vibration damper of claim 1, wherein the outer sleeve has a collar which supports the inner sleeve.

* * * * *